United States Patent [19]
Gardner

[11] 3,881,694
[45] May 6, 1975

[54] TIGHTENING SPINDLE FOR MOBILE HOMES

[76] Inventor: Elmer W. Gardner, General Delivery, Graysville, Tenn. 37338

[22] Filed: Aug. 27, 1973

[21] Appl. No.: 391,607

[52] U.S. Cl. .................. 254/164; 24/68 D; 24/269; 248/361 A
[51] Int. Cl. ............................................. B66f 13/00
[58] Field of Search ......... 254/51, 52, 79, 161, 164; 24/68 CD, 68 D, 68 R, 269; 248/361 A; 242/96

[56] References Cited
UNITED STATES PATENTS

| | | | |
|---|---|---|---|
| 1,267,540 | 5/1918 | Green | 254/161 |
| 2,642,639 | 6/1953 | Meighan | 24/269 |
| 3,747,288 | 7/1973 | Grimelii | 24/269 X |

FOREIGN PATENTS OR APPLICATIONS

| | | | |
|---|---|---|---|
| 218,389 | 4/1961 | Austria | 254/161 |
| 709,873 | 8/1931 | France | 24/269 |
| 465,214 | 8/1928 | Germany | 254/161 |

*Primary Examiner*—Al Lawrence Smith
*Assistant Examiner*—Robert C. Watson
*Attorney, Agent, or Firm*—Lamont Johnston

[57] ABSTRACT

A device for tightening and holding a band securing a movable object such as a mobile home in a fixed position. The device includes a U-shaped bracket which is secured to an anchor and a rotatable spindle journaled in the bracket near its ends; the bracket has aligned holes through its sides. The spindle is slotted to receive the band and is fixed to a circular disc having a series of concentrically located apertures through it in selective alignment with the holes through the bracket. A tightening lever is actuated to rotate the spindle and wind the band around it to tighten the band. The disc and spindle are locked in tightened position by a bolt passed through an aperture in the disc aligned with the holes through the bracket.

1 Claim, 6 Drawing Figures

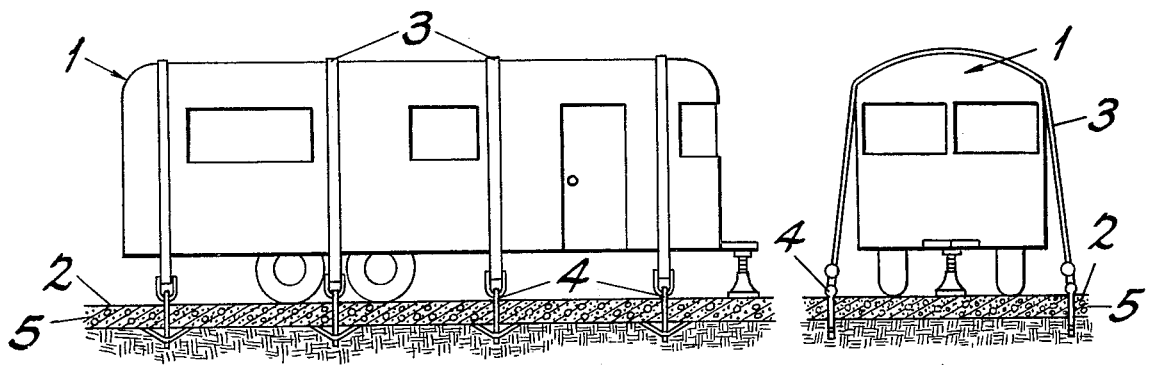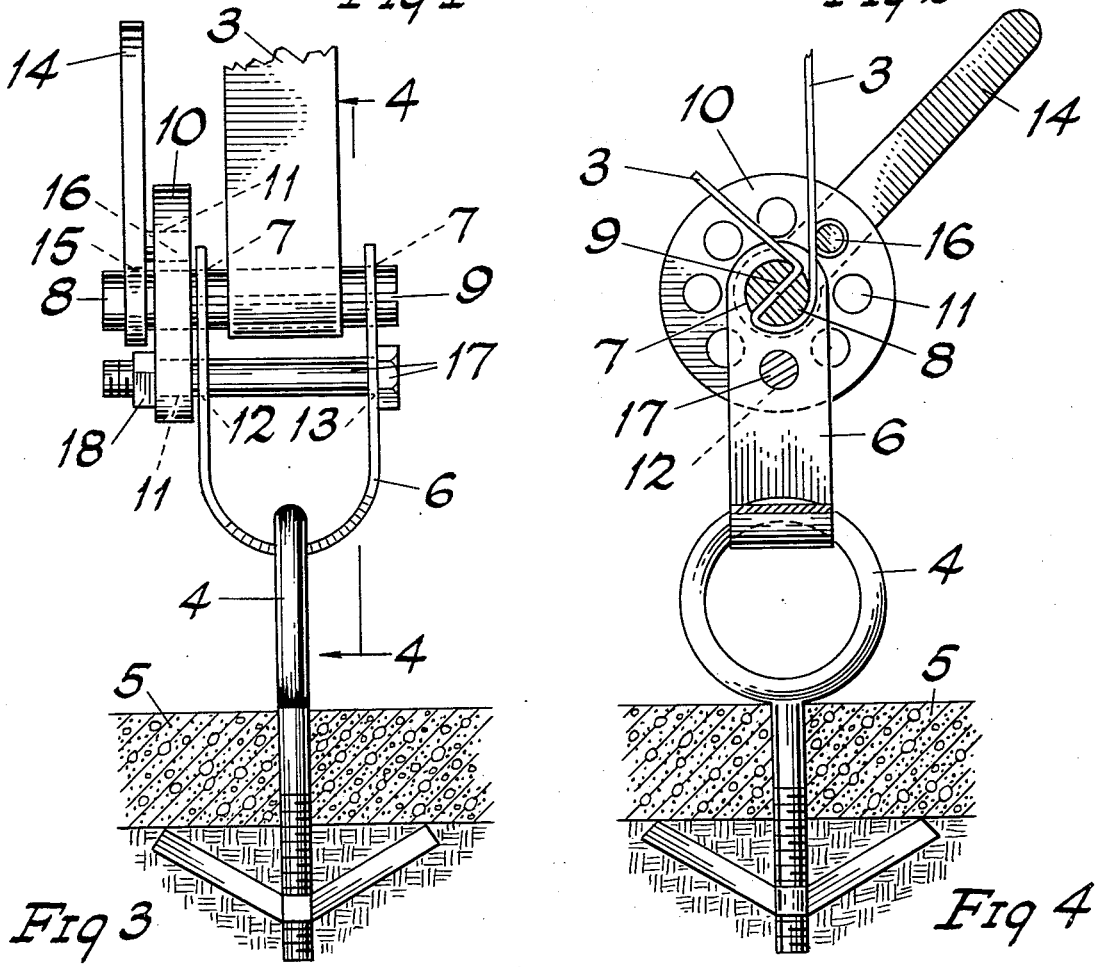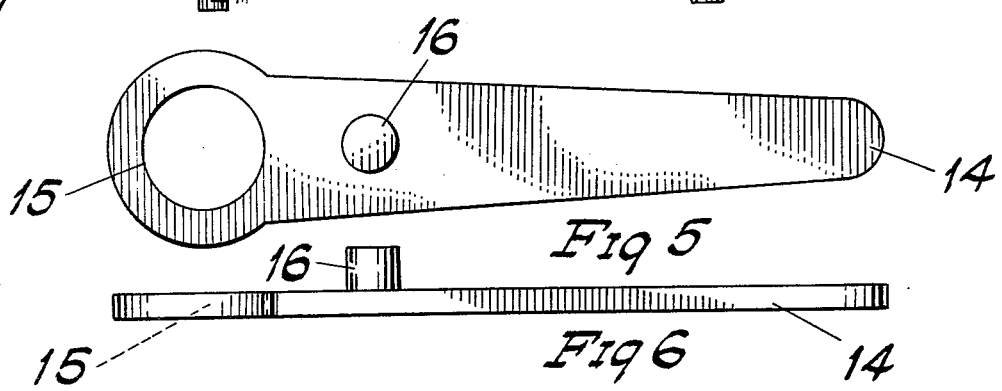

TIGHTENING SPINDLE FOR MOBILE HOMES

BACKGROUND OF THE INVENTION

With the increasing mobility of people in this country, due to highways which have been greatly improved in recent years, and to increased leisure time, the use of mobile homes and travel trailers has greatly increased. The increase in the use of mobile homes is also due to the rapidly rising cost of building and owning a house and many people find it less expensive to utilize mobile homes for their permanent residences.

Many trailer parks and camping sites where mobile homes and travel trailers may be parked provide concrete bases or aprons on which to locate the trailers. In order to prevent such trailers from being damaged or destroyed by high winds, means must be provided to afford a secure anchorage.

This invention relates to a novel device for tightening and holding a band securing a movable object such as a mobile home, travel trailer, truck, boat, airplane or the like in a secure manner to prevent it from being rocked, moved or otherwise disturbed when subjected to winds of high velocity. The device is used with a band passed over the top and down both sides of the mobile home or other object and fastened to anchors set in concrete or otherwise fixed in the ground.

An object of the invention is to provide such a device which is to be used with such bands or similar attachments for tightening and holding the band in a fixed position.

Another object is to provide a tightening and holding device which is simple and inexpensive to construct, strong, durable and highly efficient in use.

BRIEF DESCRIPTION OF THE DRAWINGS

FIG. 1 is a side view of a mobile home or house trailer secured in a fixed position by means of tie-down bands attached to anchors in the ground;

FIG. 2 is an end elevational view of the mobile home shown in FIG. 1;

FIG. 3 is an enlarged end view of one embodiment of a device made in accordance with this invention;

FIG. 4 is a view, partly in section, of the device shown in FIG. 3, taken along the line 4—4 of FIG. 3;

FIG. 5 is an enlarged side elevation of a tightening lever or wrench used with the device shown in FIGS. 3 and 4; and FIG. 6 is an end elevation of the lever shown in FIG. 5.

DESCRIPTION OF THE PREFERRED EMBODIMENT

A mobile home or travel trailer 1 is parked on a concrete base or apron 2, e.g., in a trailer park or camping site. In order to prevent the trailer from being damaged or destroyed by high winds, the home may be securely fastened by means of bands 3 of steel or other suitable material which are passed from a suitable anchor 4, such as eye-bolt, securely fastened in concrete 5 in the ground of the base or apron. The band is attached to one of the eye-bolts and is passed completely over one side, the top and the other side of the home. Means for securely tightening the band is the subject of this invention.

The device for tightening and holding the band comprises a U-shaped bracket 6 which is passed around the eye-bolt 4. The bracket has aligned bearings 7 for the reception of a rotatable spindle 8 journaled in the bracket near its ends. A diametrical slot 9 is cut through the spindle throughout most of its length. The band 3 is passed through the slot and the spindle is then rotated to tighten the band, as shown in FIGS. 3 and 4. To the spindle is fixed a circular disc 10 near one end of the spindle. The disc has a series of concentrically located aperatures 11 through it in selective alignment with aligned holes 12 and 13 through the bracket 6.

To rotate the spindle 8, a tightening lever 14 is provided having a circular hole 15 through it at one end. The spindle 8 fits through the hole 15 in the lever and at the same time a lug 16, adjacent to the hole 15, passes through one of the holes 11 through the disc 10. Thus, when the lever is moved in a circumferential direction, its lug causes the disc to rotate, thereby tightening the band 3, held by the slot 9 through the spindle, by winding it around the spindle, as shown in FIG. 4.

Rotation of the lever and the disc is continued until the band has been tightened adequately. At that time, a bolt 17 is passed through the aligned holes 12 and 13 in the bracket and through a suitable one of the aperatures 11 through the disc 10, a nut 18 being screwed onto the bolt to hold it securely.

By this invention there is provided a novel and practical, as well as inexpensive, means for tightening and holding a band securing a movable object such as a mobile home in a fixed position. This prevents the home from being rocked, moved or otherwise disturbed when subjected to high winds. The bands passed over the top and down both sides of the mobile home and fastened to anchors set in the ground hold the home securely in place.

A device made in accordance with this invention is simple and inexpensive to make, strong, durable and highly efficient in use.

It will be apparent to those skilled in the art that various changes may be made in the invention, without departing from the spirit and scope thereof, and therefore the invention is not limited by that which is shown in the drawings and described in the specification, but only as indicated in the appended claims.

I claim;

1. A device for tightening and holding an inflexible metal band securing a movable object in a fixed position relative to the ground comprising a U-shaped bracket having aligned first and second pairs of holes through its sides and secured to an anchor fastened in the ground, a rotatable spindle slotted to receive the band and journaled in said first pair of aligned holes in the bracket, a circular disc fixed to the spindle outside of the bracket having a series of concentrically located apertures through it in selective alignment with said second pair of holes through the bracket, a readily detachable tightening lever having a circular hole at one end through which the spindle fits and a lug adjacent to the hole projecting through one of the concentrically located apertures in the disc to wind continuously the band around the spindle and tighten it and means for locking the disc and spindle in tightened position.

* * * * *